United States Patent [19]

Haines, Sr.

[11] 4,204,700

[45] May 27, 1980

[54] ANTI-JACKKNIFE APPARATUS

[75] Inventor: Joseph R. Haines, Sr., Bordentown, N.J.

[73] Assignee: Haines Towing Inc., Bordentown, N.J.

[21] Appl. No.: 958,881

[22] Filed: Nov. 8, 1978

[51] Int. Cl.² .............................................. B62D 53/08
[52] U.S. Cl. .................................... 280/432; 280/474
[58] Field of Search .................... 280/432, 433, 446 B, 280/474

[56] References Cited

U.S. PATENT DOCUMENTS

| | | | |
|---|---|---|---|
| 2,692,146 | 10/1954 | Black | 280/432 |
| 2,740,641 | 4/1956 | Rugar | 280/432 X |
| 3,733,090 | 5/1973 | Keller | 280/432 |
| 3,850,449 | 11/1974 | Link | 280/432 |

Primary Examiner—John A. Pekar
Attorney, Agent, or Firm—Robert A. Green

[57] ABSTRACT

The disclosure is of a tractor and trailer combination in which the tractor has the fifth wheel structure and the trailer carries, embedded in its floor, an assembly adapted to be coupled to the fifth wheel. The assembly includes two pins adapted to be detachably coupled to the fifth wheel and connected each to a plunger of an pneumatic cylinder.

In operation, when the trailer tends to turn with respect to the tractor and the fifth wheel, one of the pins and its piston are driven to cause compression of its pneumatic cylinder which thus opposes the turning of the trailer and prevents jackknifing.

5 Claims, 5 Drawing Figures

ANTI-JACKKNIFE APPARATUS

BACKGROUND OF THE INVENTION

Jackknifing has been a problem for the trucking industry for many years, and many systems for solving the problem are available in the prior art. However, these known systems have never come into wide use for reasons which are not completely understood. For one thing, these known systems may be too complex and may not operate as well as desired. The present invention provides a relatively simple and effective anti-jackknifing system.

DESCRIPTION OF THE PREFERRED EMBODIMENTS

Figure 1:
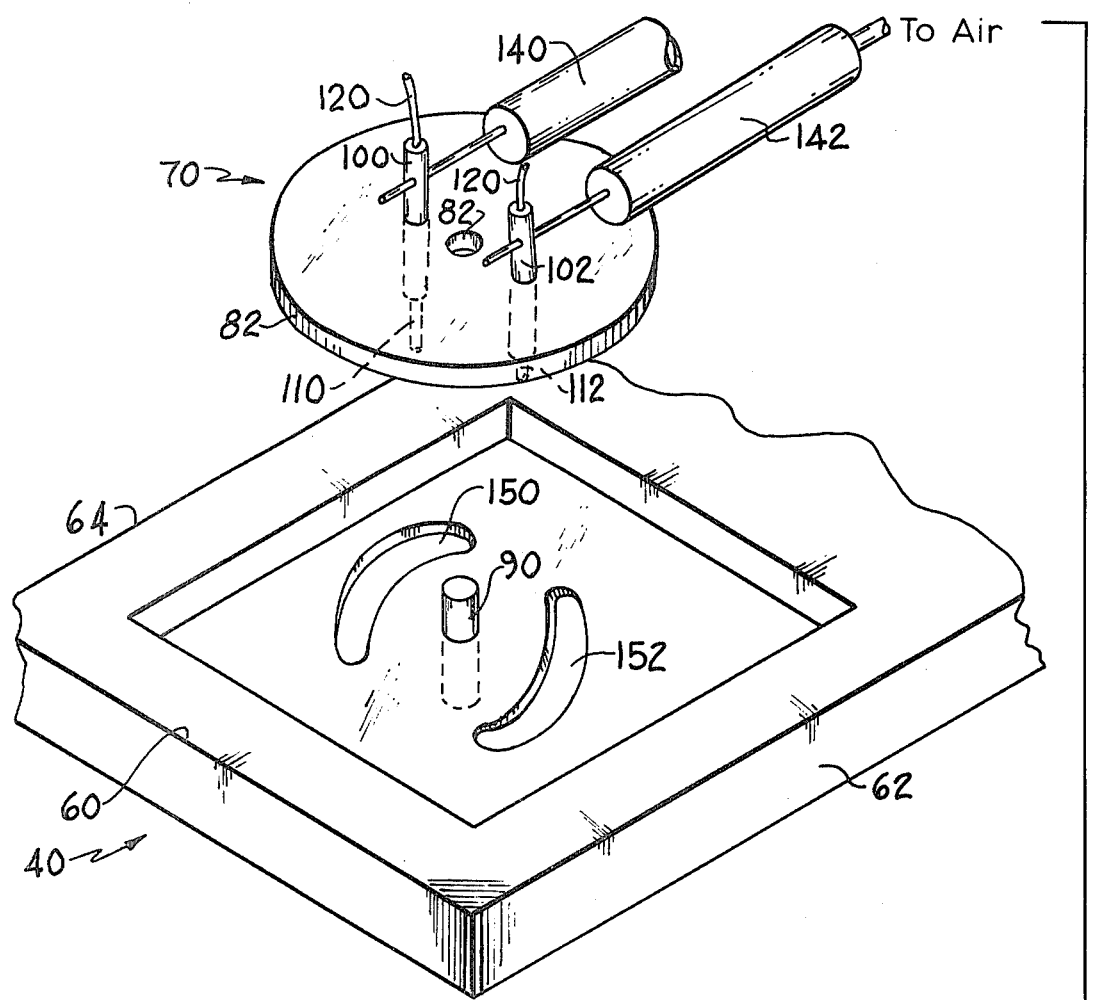
FIG. 1 is a perspective exploded view of the invention.
Figure 1:
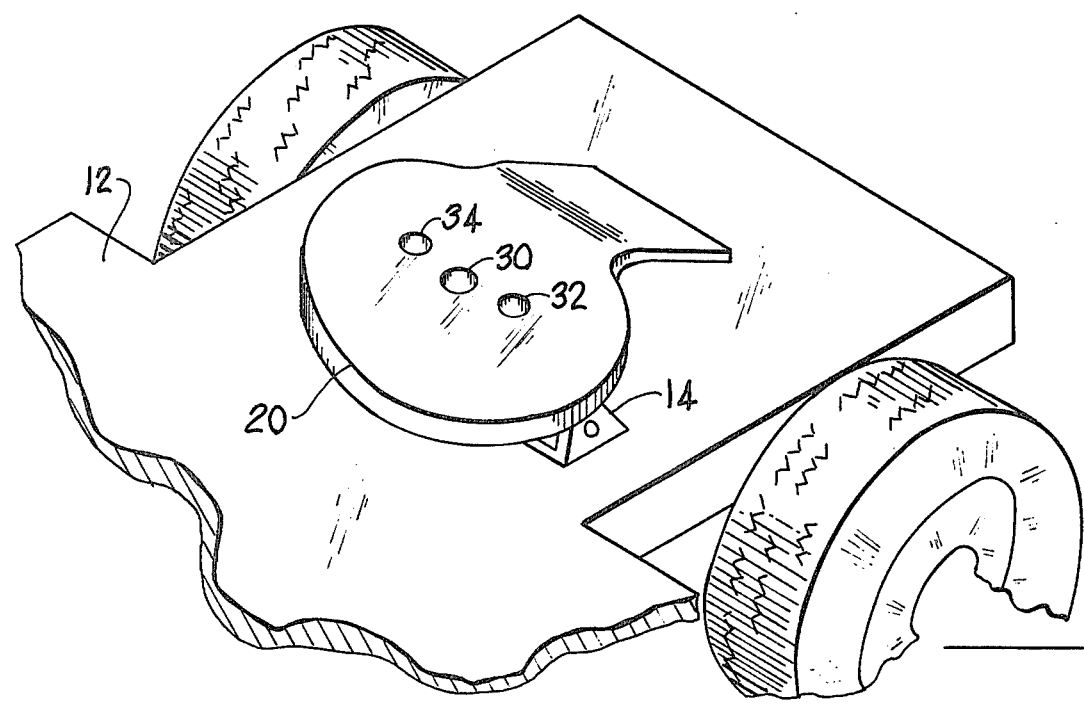
Figure 2:
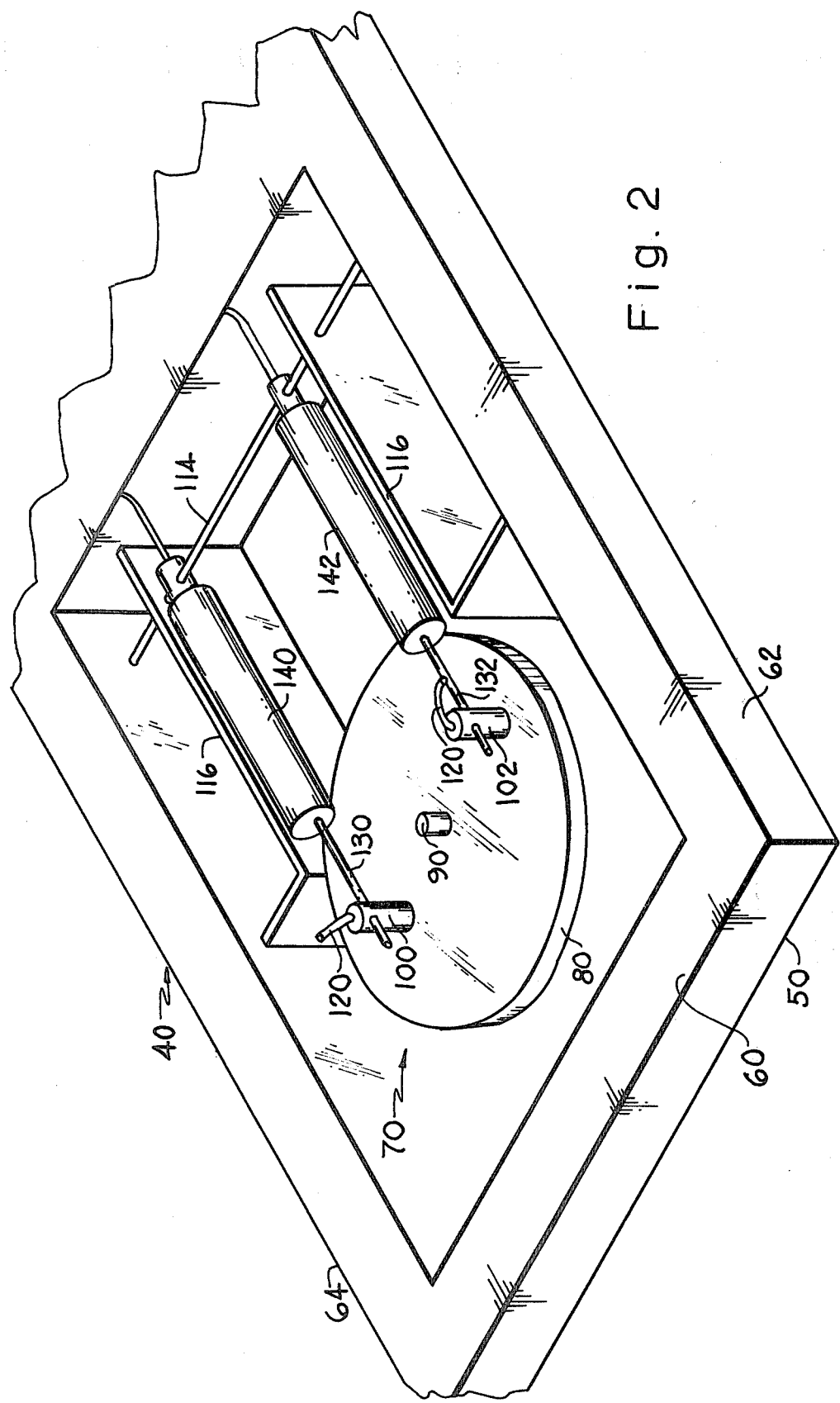
FIG. 2 is a perspective view of a portion of the apparatus shown in FIG. 1.

A tractor 10 has secured to its rear deck 12, a horizontal pivot 14, to which is secured a fifth wheel 20 of generally conventional construction, the fifth wheel being pivotable about said horizontal pivot. According to the invention, the fifth wheel has a central aperture 30 and two auxiliary apertures 32 and 34 on either side thereof, all of the apertures being generally horizontally aligned on a line which is parallel to pivot 14 and transverse to the longitudinal axis of the tractor-trailer combination.

A trailer 40 of generally typical construction has a base or outer wall 50, an inner floor 60 spaced from the base, and side walls 62 and 64. At the front end of the trailer, the usual kingpin 90 is secured to the trailer base 50, for example, and a coupling apparatus 70 embodying the invention is mounted between the base 50 and the inner floor 60 and accessible from beneath the trailer. The coupling apparatus includes a plate 80 suitably supported generally horizontally adjacent to base 50 and having a central aperture 82, by means of which it is threaded on and rotatable about vertical kingpin 90. The kingpin is adapted to be inserted in the central aperture 30 of the fifth wheel 20 to provide the primary connection between the tractor 10 and trailer 40.

The plate 80 also carries a pair of vertically mounted pneumatic air cylinders 100 and 102 on either side of the kingpin aperture 82, the cylinders having vertically disposed pistons or pins 110 and 112, each of which extends below the trailer base 50 and is adapted to be inserted into one of the auxiliary apertures 32, 34 in the fifth wheel. Air lines 120 coupled to the cylinders 100 and 102 are coupled to a source of air and control means in the cab so that the driver can operate the cylinders to control the position of the pins 110, 112, that is, either extended and disposed in the apertures 32 and 34 or retracted and disconnected from the fifth wheel. The air cylinders operate like typical automobile shock absorbers.

The pneumatic cylinders may be secured to the trailer in any suitable fashion, and, in one arrangement, they are pivotally secured to a horizontal shaft 114 which extends transversely through their rear ends and is secured at its ends to the side walls 62 and 64 of the trailer bed. In addition, longitudinal guide walls 116 are provided between each side wall 62 and 64 and a cylinder to retain the cylinders in position.

The base of the trailer is provided with arcuate slots 150, 152, in which the vertical air cylinders 100, 102 are seated, and in which they can move.

The air cylinders 100, 102 are secured to the horizontally oriented pistons 130, 132 of larger air cylinders 140, 142 which are horizontally disposed and suitably secured to the frame of the trailer and to the base and floor, as required. These air cylinders are also coupled to the source of air.

Figure 3:
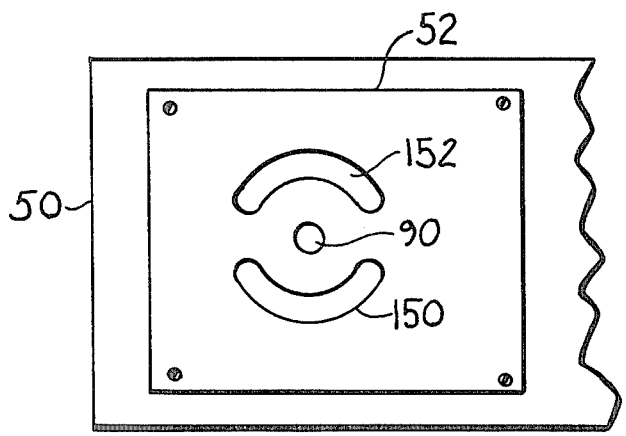
FIG. 3 is a bottom plan view of a portion of the trailer of the invention.
Figure 4:
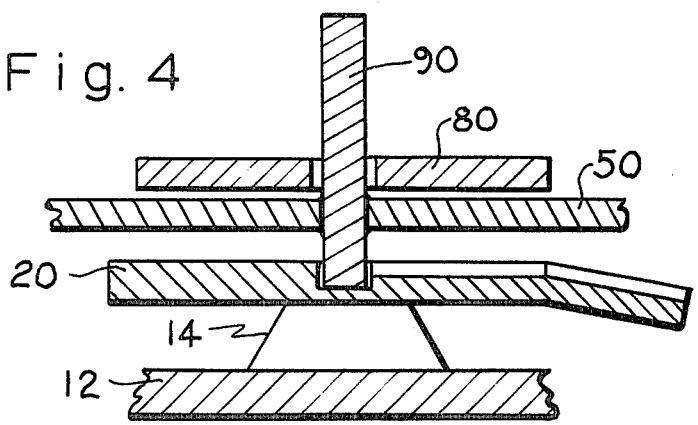
FIG. 4 is a sectional elevational view of a portion of the invention.
Figure 5:
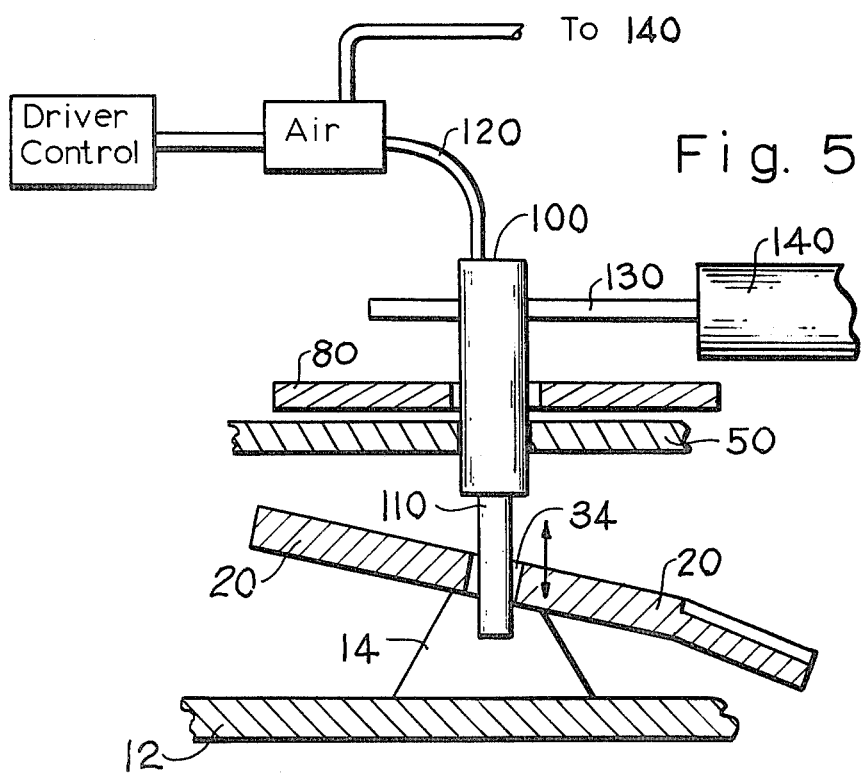
FIG. 5 is a sectional elevational view of another portion of the invention.

A portion of the base 50 in the form of a panel 52 (FIG. 3) can be made removable to provide access to the coupling apparatus 70.

In operation of the invention, before the trailer 40 is coupled to the tractor 10, the pins 110, 112 are retracted, and the tractor and trailer are coupled together with the kingpin 90 in the aperture 30 in the fifth wheel 20.

After the tractor and trailer have been coupled together, the driver operates the cylinders 100, 102 to insert the locking pins 110, 112 into the apertures 32 and 34 in the fifth wheel 20. Now the tractor and trailer are operated in normal fashion, and the parts are designed so that normal turning is permitted by the tractor and trailer. However, if the trailer tends to turn excessively, approaching a jackknife situation, one or the other of the pins 130, 132, pushed by cylinder 100 or 102 and moving in slots 150 and 152, will meet the resistance of the air cylinder 140 or 142 to which it is coupled and thereby prevent the trailer from turning excessively with respect to the tractor. Of course, at any time during the operation of the tractor and trailer, the driver may disconnect the pins 110, 112 from the fifth wheel to permit controlled turning of the tractor and trailer by the driver.

It is noted that the cylinders 140 and 142 are mounted or constructed to permit the pistons 130 and 132 to move as required when the fifth wheel rotates and moves the cylinders 110 and 112 in the slots 150 and 152 in the trailer base.

Up to the present time, tractors and trailers have been coupled together by a single kingpin, and the present invention, in addition to providing the anti-jackknifing protection, provides three coupling pins 90, 110, 112. Thus, a considerable extra safety factor is introduced.

It is to be understood that the various coupling and locking pins and the air cylinders will be designed to have the necessary strength and capacity to perform as described above.

In practicing the present invention, it is desirable that the cylinders 140 and 142 operate in the same way that the buffer cylinders used on screen and storm doors operate. That is, the harder or the faster the piston is operated, the greater the resistance. This type of operation can be achieved by fluid flowing through a small opening which acts like a metering jet, and the driver could control the amount of resistance to jackknifing by a control lever in the cab. However, the initial resistance would be automatic.

The invention would also provide protective action in the case of a blowout, on the tractor or the trailer, which might cause sudden turning of the tractor and trailer with respect to each other.

What is claimed is:

1. Tractor-trailer control apparatus comprising a tractor and a trailer adapted to be coupled and decoupled, and having a longitudinal axis, said tractor carrying a generally horizontal fifth wheel having first, second, and third apertures extending vertically therethrough, said apertures being aligned on an axis oriented transverse to the longitudinal axis of said tractor-trailer combination, said trailer carrying a kingpin for insertion into the second of said apertures which is the central aperture of the three apertures in said fifth wheel whereby said tractor and trailer can be mechanically coupled together, a pair of penumatic cylinders secured to said trailer and oriented generally parallel to said longitudinal axis, each cylinder having an operating piston, one piston being aligned with said first aperture and one piston being aligned with said third aperture, coupling means secured to each of said pistons and positioned for removable insertion in said other two apertures in said fifth wheel whereby said pneumatic cylinders can be rigidly connected to or disconnected from said fifth wheel, whereby rotation of said fifth wheel transmits motion through said coupling means and said pistons to said pneumatic cylinders which in turn oppose the rotation of said fifth wheel and of said trailer with respect to said tractor, and a controllable source of air coupled to said pneumatic cylinders to adjust the degree of resistance of said cylinders to rotation of said fifth wheel and to relative movement between said tractor and trailer.

2. The apparatus defined in claim 1 wherein said coupling means includes a second pair of pneumatic cylinders vertically oriented and having pistons oriented vertically, one piston aligned with said first aperture and one piston aligned with said third aperture, whereby said pistons may be inserted in or removed from said first and third apertures whereby said first pair of cylinders may be coupled to or decoupled from said fifth wheel, said source of air also being connected to said second pair of cylinders.

3. The apparatus of claim 2 and including a horizontal plate to which said second pneumatic cylinders are secured, said horizontal plate being disposed adjacent to the base of said trailer and rotatably mounted on said kingpin.

4. The apparatus of claim 2 wherein the base of said trailer includes generally arcuate slots through which said second pneumatic cylinders extend toward the fifth wheel.

5. The apparatus defined in claim 2 and including means for the tractor driver to control said source of air and the operation of said pneumatic cylinders and said second pneumatic cylinders.

* * * * *